J. F. OLDHAM.
RESILIENT WHEEL.
APPLICATION FILED OCT. 16, 1918.
1,309,540.
Patented July 8, 1919.
2 SHEETS—SHEET 1.
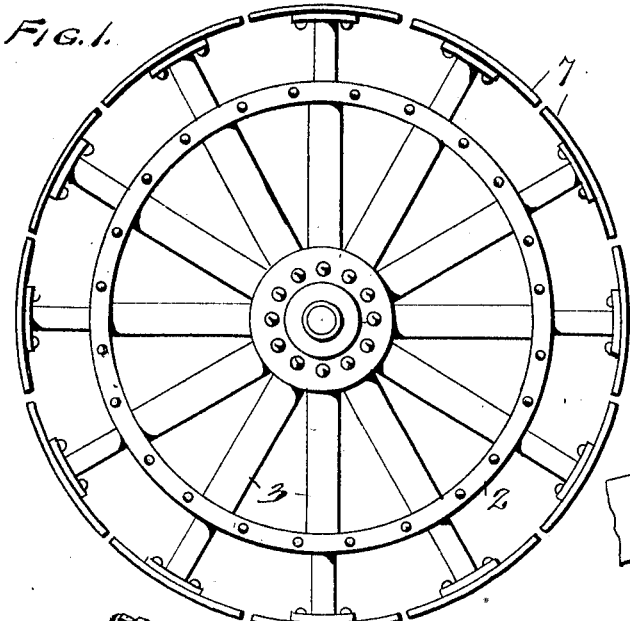
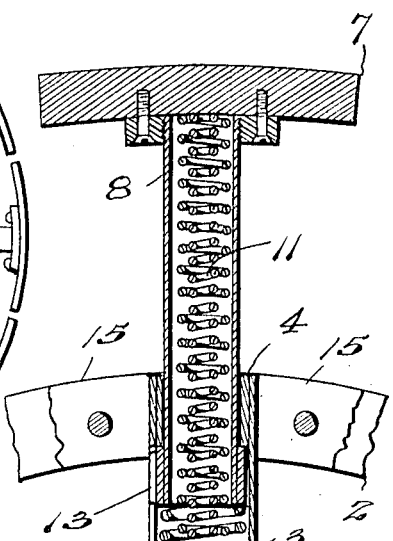
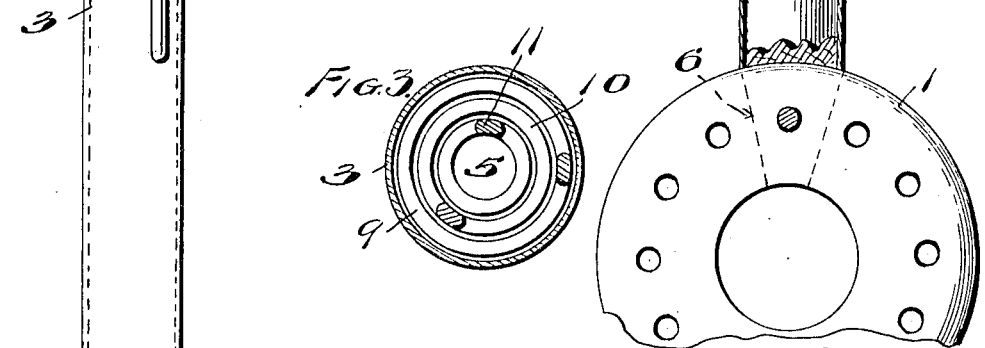
John F. Oldham, Inventor

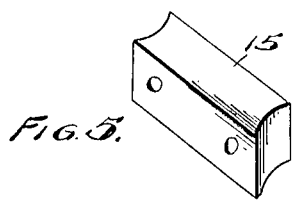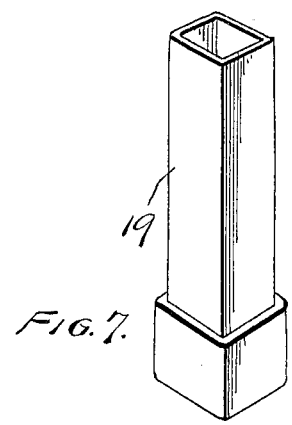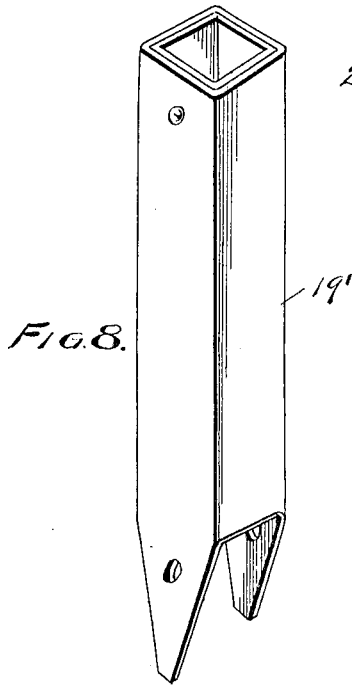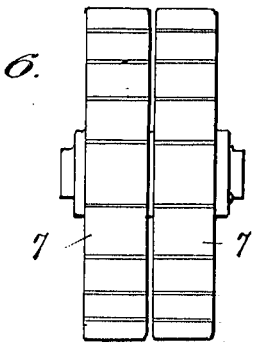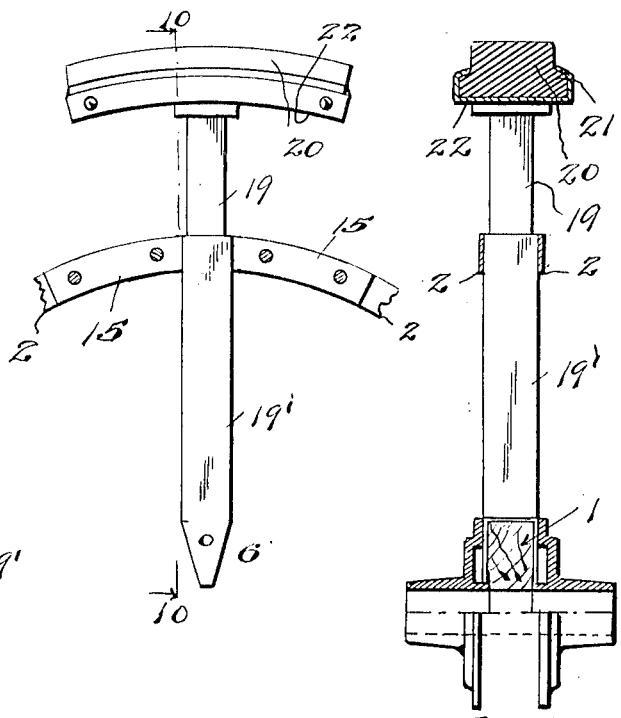

UNITED STATES PATENT OFFICE.

JOHN F. OLDHAM, OF NEW YORK, N. Y.

RESILIENT WHEEL.

1,309,540.  Specification of Letters Patent.  Patented July 8, 1919.

Application filed October 16, 1918.  Serial No. 258,321.

*To all whom it may concern:*

Be it known that I, JOHN F. OLDHAM, a citizen of the United States, residing at New York city, in the State of New York, have invented certain new and useful Improvements in Resilient Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in resilient wheels of the separable segment tire type, and consists of a simple and efficient device of this character having various details of construction, combination and arrangement of parts which will be hereinafter fully described, shown in the accompanying drawings and then specifically defined in the appended claims.

I illustrate my invention in the accompanying drawings which, with the letters of reference marked thereon, form a part of this application and in which:

Figure 1 is a side elevation of a wheel made in accordance with my invention.

Fig. 2 is an enlarged detail central sectional view longitudinally through the spoke section.

Fig. 3 is a cross sectional view on line 3—3 of Fig. 2.

Fig. 4 is a perspective view of the hub engaging tubular spoke section and an adjacent end of a tubular telescoping spoke section.

Fig. 5 is a perspective view of a spacing block.

Fig. 6 is an edge view of a double wheel.

Fig. 7 is a detailed view of a modified form of spoke section.

Fig. 8 is a detail perspective view of a modified form of a tubular hub engaging spoke section.

Fig. 9 is a detail in elevation of a section of a wheel, and Fig. 10 is a sectional view on line 10—10 of Fig. 9.

Reference now being had to the details of the drawings by numerals:

1 designates the hub of a wheel, and 2 an inner circular rim portion, having openings for the reception of the tubular spoke sections 3, each of which has a collar 4 fastened to the inner surface thereof adjacent to its outer end, and each tubular spoke section is provided with a filler 5 at its inner end. The inner portion of each tubular spoke section has tapering wings 6, as is shown in the detailed view of the drawings and which straddle the hub and are securely fastened thereto.

The separate tread segments or shoes are designated by numeral 7 and to each of the same a spoke section 8 is fastened and which telescopes within the tubular spoke section 3. In telescoping the parts, the section 8 with its tubular collar may be inserted within the section 3, after which the collar 4 may be fastened within the section 3. Coiled springs 9, 10 and 11 are interposed one within another within the tubular spoke sections and their inner ends bear against the outer end of a filler 5. Upon the tubular spoke section 8 is a collar 12 having a lug 13 projecting from the circumference thereof, said collar adapted to be fastened to the tubular spoke section 8, and the lug 13 thereon is designed to have a longitudinal movement within the slot 14 formed longitudinally in the wall of the tubular spoke section 3, serving to guide the tubular spoke section 8 as it moves longitudinally within the section 3. While I have shown three coiled springs, it will be understood that one or more may be employed according to the size of the load which will come upon the wheel. Space blocks 15 are mounted in openings in the rim and their adjacent ends bear against the tubular portion 3.

In Fig. 6 of the drawings I have shown two wheels similarly constructed and fastened together side by side and which are provided for use upon heavy trucks or other vehicles where heavy loads are to be supported by the wheels, and in this modified form the detailed construction of the two wheels sections are identical and made to stand equally the strain upon the same.

In Figs. 7 and 8 of the drawings are shown square tubular spoke sections 19 and 19′ adapted to telescope one within another and which may be provided for use, if desired, in preference to the tubular spoke sections, and 20 designates a tread section, having flanges 21 engaged by the metallic rim 22, and which modified form may be utilized if preferred in place of the tread shoe 7 which is made preferably of metal.

In the make up of the wheel embodying the features of my invention, any number of tubular spoke sections may be employed, so that two or more of the tread sections will receive the pressure and distribute the same equally according to the load required on the wheel.

What I claim to be new is:

1. A resilient wheel, comprising a hub portion and a rim with openings therein, tubular spoke sections engaging the openings in the rim and having wings at their inner ends for engagement upon opposite sides of the hub, tread shoes, a tubular spoke section fastened to each shoe and telescoping within a tubular spoke section which is fastened to the hub, said tubular spoke sections having shoulders adapted to limit the outer movements of the shoe-carrying tubular sections, a filler at the inner end of each hub engaging spoke section and bearing against the circumference of the hub, coiled springs concentrically mounted within the tubular spoke sections and bearing intermediate the fillers and shoes.

2. A resilient wheel, comprising a hub portion, tubular spoke sections having tapering wings at their inner ends adapted to straddle the hub portion and secured thereto, a filler within each spoke section, a rim having openings therein through which said spoke sections pass, fillers in the rim intermediate the spoke sections, a collar detachably fastened to the inner surface of each spoke section at its outer end, tread shoes, a tubular spoke section secured to each shoe and telescoping within a hub engaging spoke section, a collar at the inner end of each shoe carrying spoke section adapted to coöperate with the collar in the spoke section in which it telescopes to limit the outer movement of the shoe, and a coiled spring within the spoke sections and interposed between the shoe and filler therein.

3. A resilient wheel, comprising a hub portion and having a rim with openings therein, tubular spoke sections, having their inner ends fastened to the hub and their outer ends to said rim and longitudinally slotted, and each having a collar fastened to its inner surface, a filler within each spoke section and bearing against the hub, tread shoes, a tubular spoke section secured to each shoe and telescoping within a hub engaging section, a collar about the circumference of each shoe-carrying tubular spoke section and provided with a lug movable within the slot in the hub engaging section in which it telescopes, coiled springs within the tubular sections and bearing intermediate the shoes and the fillers in the hub engaging spoke sections.

In testimony whereof I hereunto affix my signature in presence of two witnesses.

JOHN F. OLDHAM.

Witnesses:
A. L. HOUGH,
I. WHITTEMORE.

Copies of this patent may be obtained for five cents each, by addressing the "Commissioner of Patents, Washington, D. C."